July 25, 1961 W. W. CUSHMAN 2,993,667
PARACHUTE
Filed June 23, 1959

INVENTOR
Walton W. Cushman

BY *H. J. Eccleston*
ATTORNEY

2,993,667
PARACHUTE

Walton W. Cushman, Webb City, Mo.
(6428 Lumar Drive SE., Washington 22, D.C.)
Filed June 23, 1959, Ser. No. 822,397
5 Claims. (Cl. 244—142)
(Granted under Title 35, U.S. Code (1952), sec. 266)

The invention described herein, if patented, may be manufactured and used by or for the Government for governmental purposes, without the payment to me of any royalty thereon.

The invention relates to parachutes and has for its primary object to construct either cargo or personnel parachutes which will automatically function to dampen to a very high degree the oscillations of a parachute after inflation upon leaving an aeroplane or the like.

It is well known in this art that the very substantial oscillations developed in descending parachutes is caused to a large degree by the entrapped air "spilling over" from first one side and then the other as the result of excessive air pressure within the canopy. Such oscillations are, of course, objectionable for many reasons, among which may be mentioned injury to the parachutist or the cargo when a landing is about to be made.

It is an object of the present invention to so shape a parachute that it will minimize the degree and number of these oscillations per unit of time.

It is a further object of the invention to construct a parachute using ordinary or conventional materials without specially sewn panels and gores heretofore required to provide the necessary strength and resistance to opening shock.

A further object of this invention is the elimination of a major portion of the support lines and the substitution therefor of a fabric material to serve the dual purpose of supporting the load as well as contributing to better vertical stability and decreased rate of descent.

Still another object of the invention is a construction that utilizes the aerodynamics of shape or general configuration to reduce opening shock and to prevent oscillation to a greater degree than in those constructions which utilize a relatively narrow and critical range of fabric porosity to control shock and oscillation.

Other objects and advantages of the invention will be apparent from the following description taken in connection with the accompanying drawings, in which, FIGURE 1 is a perspective view of the novel parachute in inflated condition;

Figure 1:
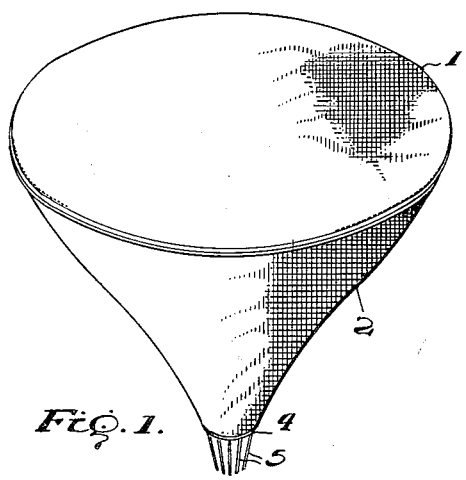
Figure 4:
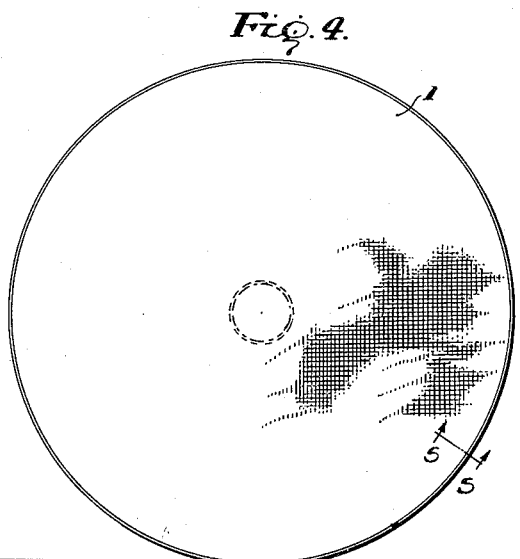
FIGURE 4 is a plan view of the parachute as shown in FIGURE 2.
Figure 2:
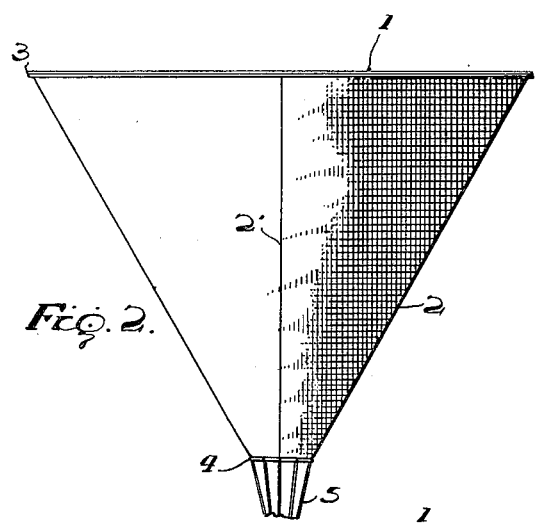
FIGURE 2 is a side elevation of the parachute in extended shape but not inflated.
Figure 5:
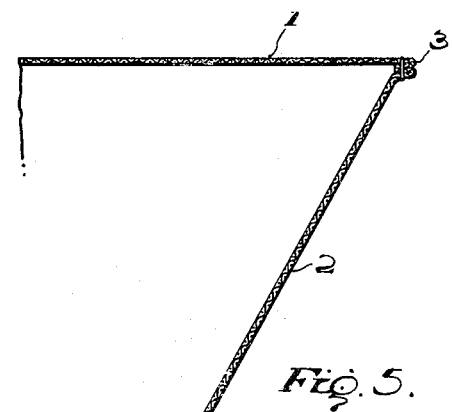
FIGURE 5 is a sectional view taken on the line 5—5 of FIGURE 4.
Figure 3:
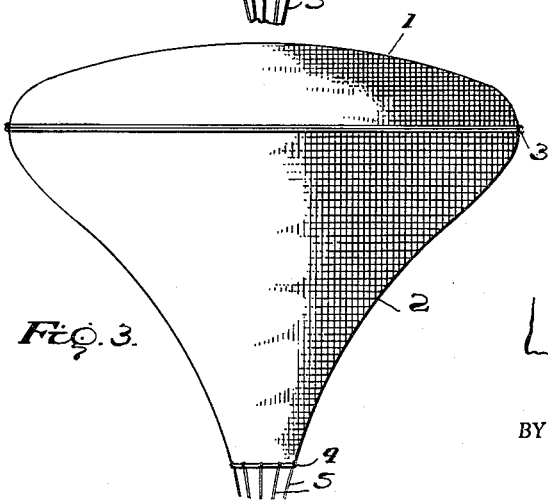
FIGURE 3 is a side elevational view of the parachute in inflated condition.

Referring to the drawings in greater detail and by reference numeral, the top or canopy of the parachute is indicated by the numeral 1 and comprises a disc of conventional parachute material. Attached to the periphery of the disc 1 is an inverted frusto-conical skirt portion 2.

The disc 1 is formed of low-porosity fabric as is customary in the construction of conventional parachutes, but in lieu of the usual support lines the present invention envisions the use of an inverted frusto-conical skirt 2 of high-porosity, high-strength fabric. These two elements are preferably united by a circumferential seam 3 which extends radially a slight distance and serves to increase the air turbulence about the descending parachute and thereby increase the drag. As thus joined, these two elements form, in relaxed condition, a substantially equilateral triangle when viewed in side-elevation.

The high-porosity fabric 2 which forms the skirt of the parachute may be likened to ordinary mesh cloth except that it may be woven from nylon thread which is much stronger than ordinary cotton thread. The frusto-conical element 2 is shown as formed of one piece of material turned into shape and having its ends united by a single seam 2'. To the lower end of the skirt 2 is secured a reinforced fabric ring 4 to which is attached conventional load support lines 5 of relatively short length.

In the operation of this novel parachute, very little air is trapped through the opening surrounded by the ring 4, except during the few seconds of deployment when the canopy is filling. Thereafter, the air enters primarily through the interstices of the fabric from which the cone or skirt structure is fabricated, except near the top of the skirt when outward leakage of air may equal or exceed the inward leakage of air. During slight changes in the attitude of the parachute in descent, such as in oscillation, the projected area of the low side is greater than that of the high side which causes the low side to induce more drag and the high side to induce less drag. Thus, the oscillations are damped in much the same manner as produced by the dihedral angle in an aircraft wing, i.e., if the parachute is tilted with respect to the air stream the drag area is increased tending to prevent such oscillatory displacement. Also, the tilt will tend to increase the inward flow of air on the downward or underside of the cone and at the same time will tend to force more air out through the opposite side, instead of inward, as in normal, straight descent. This tends to provide a small amount of jet-reaction to the high side which further contributes to the recovery of a vertical attitude.

From the foregoing description taken in connection with the accompanying drawings, it will be apparent to those skilled in the art that I have devised a novel construction of a parachute formed primarily of two pieces of material, namely, a canopy and an inverted frusto-conical skirt, that the laterally extending seam joining these elements provides increased turbulence in the surrounding air with attendant increase in drag on the parachute, that the difference in porosity between the material of the canopy and the skirt, together with the general shape of these combined elements, provides a very substantial reduction in both the size and number of oscillations as the parachute descends to the ground, that the use of the skirt as a supporting means increases the aerodynamic drag by forcing the air to first pass through a coarse mesh fabric before it is entrapped by the lower porosity fabric in the circular canopy, and that such supporting skirt can be successfully used in lieu of most of the materials heretofore used for support lines to thus provide more effective parachute drag with no significant increase in weight.

In accordance with the patent statutes, I have described what I now consider to be the preferred construction of the parachute but since minor changes may be made in the structural details without departing from the spirit of the invention, it is intended that all such changes be included within the scope of the appended claims.

I claim:

1. A parachute comprising a disc-like top portion of flexible imperforate material having low air permeability, and a dependent inverted frusto-conical skirt portion circumferentially joined to said top portion, said skirt portion being of high strength woven flexible material having higher air permeability than said top portion, load lines extending from the lowermost section of said inverted frusto-conical skirt portion, said lowermost section having an opening interiorly of the points of attachment of said load lines to said skirt portion, and means for holding said opening open; whereby said parachute is initially opened by air entering through said opening, and is thereafter steadied by gradual passage of air through the air-permeable woven material of said skirt portion.

2. A parachute according to claim 1, wherein said means comprise a ring disposed around said opening.

3. A parachute comprising a disc-like top portion of flexible imperforate material having low air permeability, and a dependent inverted frusto-conical skirt portion circumferentially joined to said top portion, said skirt portion being of high strength woven flexible material having higher air permeability than said top portion, the lowermost section of said inverted frusto-conical skirt section being open, a ring affixed to said skirt section around said open end, and load lines attached to said ring; whereby said parachute is initially opened by air entering through said open end, and is thereafter steadied by gradual passage of air through the air-permeable woven material of said skirt portion.

4. A parachute according to claim 1, wherein said skirt material is a porous weave of nylon.

5. A parachute according to claim 3, wherein said skirt material is a porous weave of nylon.

References Cited in the file of this patent

UNITED STATES PATENTS

| | | |
|---|---|---|
| 1,499,266 | Vieregg | June 24, 1924 |
| 1,757,247 | Hoffman | May 6, 1930 |
| 2,120,177 | Hart | June 7, 1938 |
| 2,365,230 | Volf | Dec. 19, 1944 |

FOREIGN PATENTS

| | | |
|---|---|---|
| 129,119 | Great Britain | July 7, 1919 |
| 538,414 | France | Mar. 18, 1922 |
| 69,029 | Netherlands | Dec. 15, 1951 |